March 26, 1929.   W. NATHANSON   1,707,172
CONNECTION FOR RADIATORS OR THE LIKE
Filed Sept. 20, 1926   2 Sheets-Sheet 1

Inventor:
William Nathanson

March 26, 1929. W. NATHANSON 1,707,172
CONNECTION FOR RADIATORS OR THE LIKE
Filed Sept. 20, 1926 2 Sheets-Sheet 2
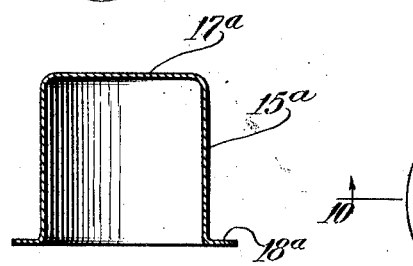
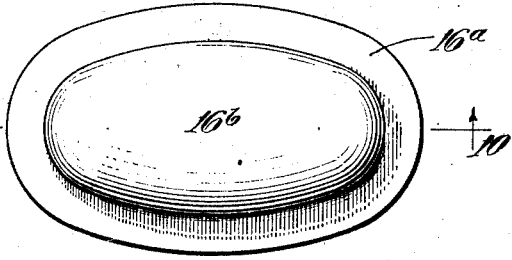
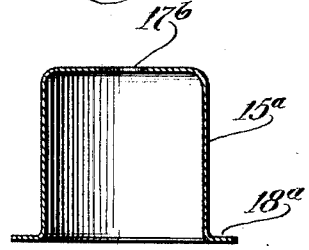
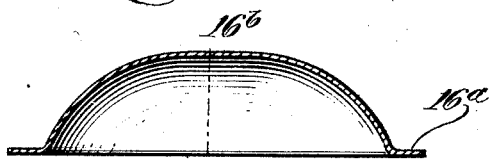
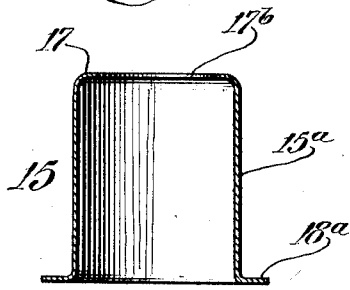
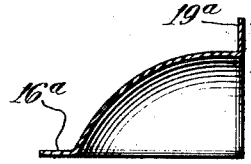
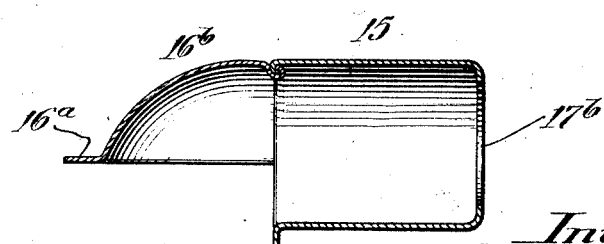
Inventor:
William Nathanson Patented Mar. 26, 1929.

1,707,172

UNITED STATES PATENT OFFICE.

WILLIAM NATHANSON, OF CHICAGO, ILLINOIS.

CONNECTION FOR RADIATORS OR THE LIKE.

Application filed September 20, 1926. Serial No. 136,438.

This invention relates to a connection primarily intended for use as the outlet passage at the base of a motor car radiator, and to the method observed in fabricating the same, although the connection might be otherwise employed, and the invention relates to the manner of forming the connection and the associated marginal walls of the structure with which it unites than to the particular purpose for which said structure is utilized.

The object of the invention is to construct a sheet metal connection, and associated parts, in such a way as to obviate the necessity for individually soldering the parts together with a union sufficiently close and tight to permit the joint to be sealed and completed by dipping the parts in a bath of solder, and to thus provide a union which will not only be water tight, but will possess elements of strength and rigidity.

In the drawings:

Figs. 6, 7 and 8 are sectional elevations illustrating progressively the method observed in fabricating the tubular portion of the connection;

Fig. 9 is a plan view of the pressed out blank from which the angle portion of the connection is fabricated;

Fig. 10 is a sectional elevation of the same taken on line 10—10 of Fig. 9;

Fig. 11 is a sectional elevation of the completed angle portion; and

Fig 12 is sectional elevation of the tubular and angled portions in assembled relation.

Figure 1:
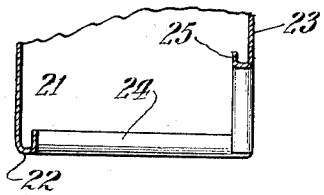
Figure 1 is a sectional elevation through the base of the structure with which the connection is to be united.

The elbow of the present invention comprises a tubular section 15 and an angled portion 16. The tubular section is provided at its free end with an inturned flange 17, and at its connecting or interlocking end with a reversely turned hook shaped flange 18, which latter interlocks with a reversely turned flange 19 formed on the semi-circular uniting edge of the angle shaped section 16.

The angle section 16 is of half dish shaped formation, and forms with the tubular section 15 a union along a little more than one-half of the uniting edge of said tubular section, the remaining portion lying in a plane above the rim of the angled section. The rim is provided with an outwardly and downwardly turned flange 20, the rim being rounded along a portion thereof most distant from the tubular section 15, which rounded portion emerges into the straight side portions 20$^a$, which latter meet in abutting relation against the inner flanged end of the tubular section.

Figure 2:
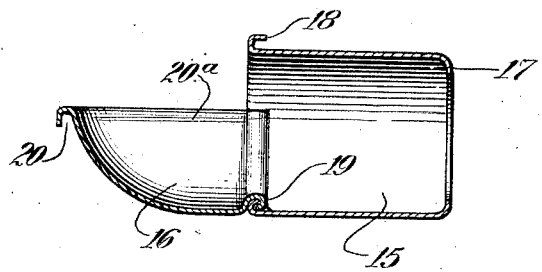
Fig. 2 is a sectional elevation of the connection in position to be assembled onto the structure of Fig. 1.

The connection thus connected and with the flanges interlocked, as indicated in Fig. 2, is brought into registry with the lower end of a radiator 21 or other structure with which the connection is to be associated. The bottom or floor 22 of the radiator or the like is provided with an arched portion, which at its enlarged outer end merges into an arched aperture in the side wall 23, the two apertures being configured to register or end with the corresponding portions of the connection.

Figure 3:
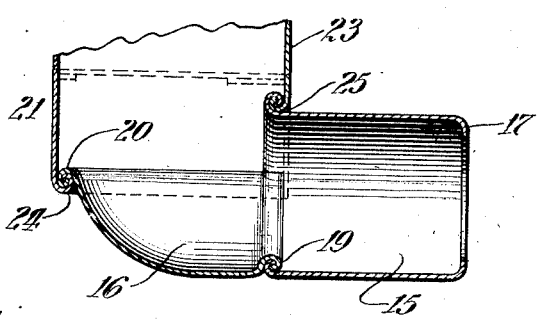
Fig. 3 is a similar view showing the parts thus assembled.
Figure 4:
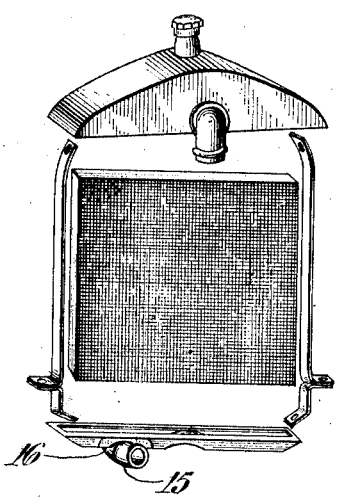
Fig. 4 is a perspective view of an automobile radiator with the parts in disassembled relation.
Figure 5:
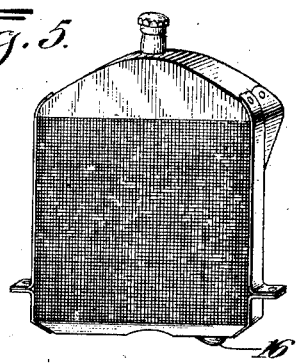
Fig. 5 is a front view of the radiator with the connection assembled.

The margin of the bottom aperture is upturned to afford a flange 24, and the margin of the side aperture is inturned to afford a flange 25, which flanges 24 and 25 are adapted to interlock respectively with the flanges 20 and 18 on the two sections of the connection, as indicated in Fig. 3, which shows all of the parts in interlocking relation with one another. From this figure, it will be evident that the lower portion of the flange 18 maintains an interlocking relation with the flange 19 up to the point where the sides of the connection come into engagement with the flange 25 on the aperture in the side wall of the radiator, so that there will be no appreciable gap in the continuity of the closure at this point. In like manner, the flanges 20 and 24 maintain an interlocked relation up to the point where the ends of the flange 24 abut against the upstanding portion of the tubular member 15, so that there will be no appreciable gap at this point. With the parts thus assembled, and the interlocked flanges rolled over to the figure indicated, a sufficiently close union between the parts will be afforded to ensure strength and rigidity, and to enable the joint to be ultimately sealed by dipping in a bath of solder which merely serves to fill any cracks or openings which is necessary to make the seam water tight.

The method of forming the tubular and angled sections of the connection will next be described. The tubular section is first pressed into the cut shaped configuration, shown in Fig. 6, having the side walls 15ª and an outstanding flange 18ª with an imperforate end wall 17ª. Thereafter a small perforation 17ᵇ is formed in the end wall. The next step is to further lengthen out the wall, as indicated in Fig. 8, which draws the metal away from the aperture and lengthens the side wall until it assumes the proportions indicated in Fig. 8. This completes the formation of the tubular section with the exception of additional rolling back of the flanges 18ª until they assume the hook shaped formation, illustrated in Figs. 2 and 3.

In forming the angled section of the connection, an oval shaped blank 16ª is first pressed out to afford a dish shaped bulge or protuberance 16ᵇ leaving a flange around the periphery. This results in a platter shaped formation having sufficient dimensions to provide for two of the angled sections. With the metal in this condition, it is cut through its higher dimensions, as indicated by dotted lines in Fig. 10, and each of the severed margins is turned upwardly to afford a flange 19ª, the ends of which merge with the ends of the arch shaped flange 16ª. This completes the formation of the angled section with the exception of a further rolling in of the flanges to permit them to interlock in the manner already described.

The method of forming the connection of the present invention is one which results in a connection having all of the advantages of an integrally formed fitting without the disadvantage attendant upon an excessive distortion of a single blank of metal, and at the same time results in a connection which may quickly and easily interlock onto the apertured walls of the radiator or other device with which the connection is associated.

I claim:

1. A connection comprising a tubular section provided at one end with an interlocking flange, and an angled section provided at one end with an interlocking flange, interlocked with a portion of the first mentioned flange, leaving a portion of the first mentioned flange free from such interlocked relation, and the angled section having a non-abutting margin extending at an angle to its said end and being provided around its non-abutting margin with an interlocking flange, substantially as described.

2. A connection comprising a tubular section provided at one end with an interlocking flange, and an angled section provided at one end with an interlocking flange, interlocked with a portion of the first metioned flange, leaving a portion of the first mentioned flange free from such interlocked relation, and the angled section having a non-abutting margin extending at an angle to its said end and being provided around its non-abutting margin with an interlocking flange, in combination with a structure having a bottom and a side wall, there being an aperture in its bottom and a merging aperture in its side wall, each of the apertures having an interlocking flange around its margin, one of said last mentioned flanges interlocking with the non-abutting marginal flange of the angled section of the connection, and the other of said last mentioned flanges interlocking with the remaining portion of the flange on the tubular section, substantially as described.

3. A connection comprising a tubular section provided around one end with an interlocking flange, and an angled section of semi-dish shaped formation provided around one end with a flange interlocking with a portion of the first mentioned flange, leaving a portion of said first mentioned flange exposed, said angled section having a non-abutting portion and the margin of the non-abutting portion being provided with an outwardly turned flange extending in angled relation to the first mentioned interlocked flanges, substantially as described.

4. A connection comprising a tubular section provided around one end with an interlocking flange, and an angled section of semi-dish shaped formation provided around one end with a flange interlocking with a portion of the first mentioned flange, leaving a portion of said first mentioned flange exposed, said angled section having a non-abutting portion and the margin of the non-abutting portion being provided with an outwardly turned flange extending in angled relation to the first mentioned interlocked flange, in combination with a structure having a bottom and side wall, and provided in its bottom with an arch shaped aperture and in its side wall with a merging arch shaped aperture, each of said apertures having around its margin an inturned flange, one of said inturned flanges being in interlocked relation with the abutting portion of the flange on the tubular section and the other of said inturned flanges being interlocked with the outwardly turned flange around the non-abutting margin of the angled section, substantially as described.

WILLIAM NATHANSON.